United States Patent [19]

Larson et al.

[11] Patent Number: 5,214,972
[45] Date of Patent: Jun. 1, 1993

[54] FAULT-TOLERANT LINEAR ELECTROMECHANICAL ACTUATOR

[75] Inventors: Lowell L. V. Larson, Huntington Beach; Richard K. Larsen, Lahabra, both of Calif.

[73] Assignee: AlliedSignal Aerospace Aerospace, Morris Township, Morris County, N.J.

[21] Appl. No.: 876,659

[22] Filed: Apr. 30, 1992

[51] Int. Cl.$^5$ ............................................. F16H 25/20
[52] U.S. Cl. ............................. 74/89.15; 74/424.8 B; 74/665 D; 244/75 R
[58] Field of Search ........ 74/89.15, 424.8 R, 424.8 B, 74/665 D; 244/75 R

[56] References Cited

U.S. PATENT DOCUMENTS

| | | | |
|---|---|---|---|
| 3,210,852 | 10/1965 | Herndon | 33/125 |
| 3,422,696 | 1/1969 | Valenti | 74/424.8 R |
| 3,766,790 | 10/1973 | Weir | 74/89.15 |
| 3,803,926 | 4/1974 | Winter | 74/89.15 |
| 4,137,784 | 2/1979 | Griffin | 74/89.15 |
| 4,614,128 | 9/1986 | Fickler | 74/89.15 X |
| 4,637,272 | 1/1987 | Teske et al. | 74/89.15 X |
| 4,745,815 | 5/1988 | Klopfenstein | 74/424.8 R |
| 4,962,676 | 10/1990 | Vainstock | 74/89.15 X |

Primary Examiner—Allan D. Herrmann
Attorney, Agent, or Firm—Hugh P. Gortler; Robert A. Walsh

[57] ABSTRACT

A linear electromechanical actuator includes back-to-back screw-type actuators whose screw nuts are secured together. During operation, the leadscrew of one screw-type actuator is rotated while the leadscrew of the other screw-type actuator is locked.

12 Claims, 1 Drawing Sheet

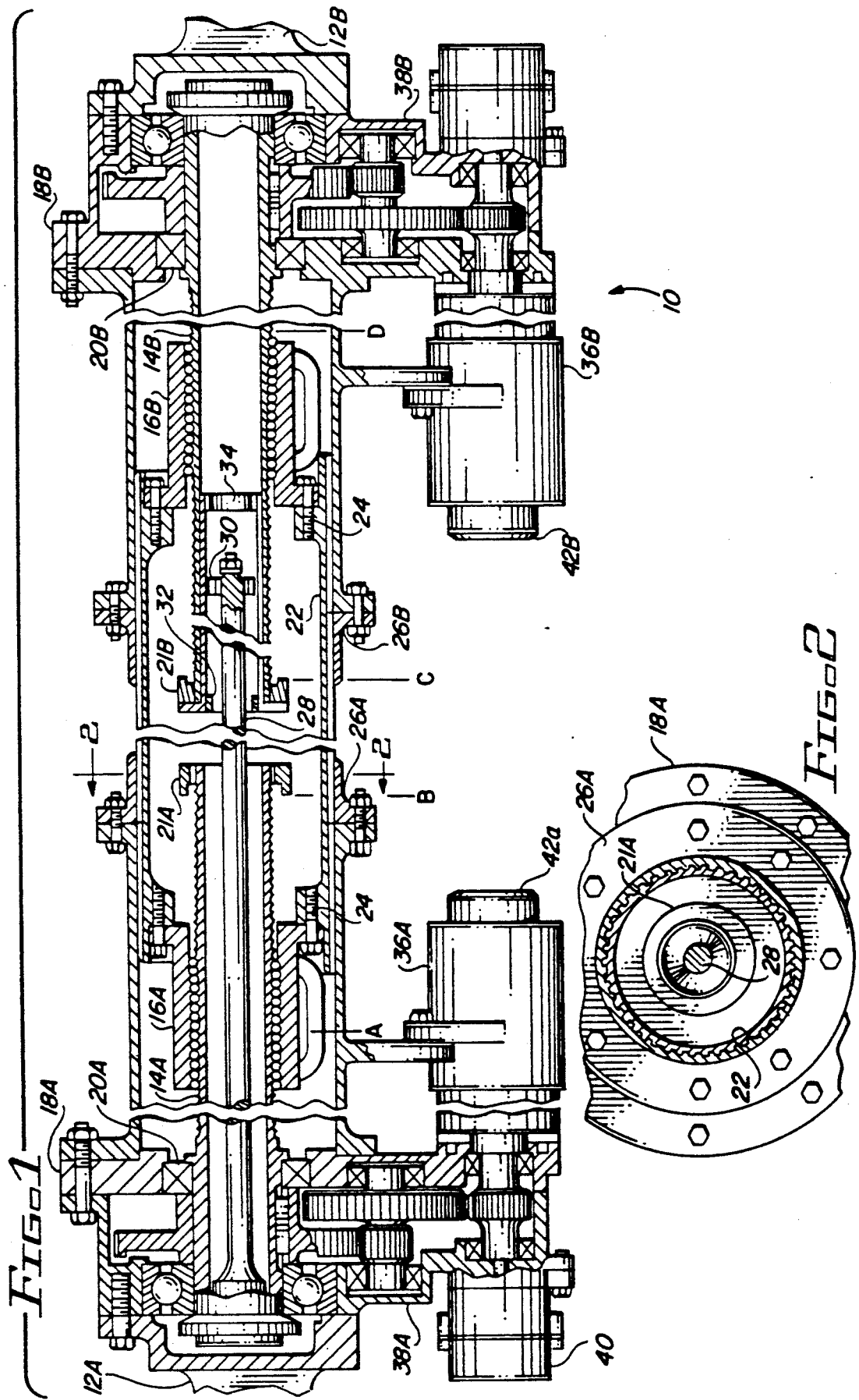

FAULT-TOLERANT LINEAR ELECTROMECHANICAL ACTUATOR

BACKGROUND OF THE INVENTION

This invention relates in general to linear electromechanical actuators and in particular to a screw-type actuator system that is fault-tolerant.

There exists a great need for fault-tolerance in fly-by-wire flight control systems, especially for the control of primary flight control surfaces such as a rudders, elevators, horizontal stabilizers and ailerons. Loss of control of one of these surfaces can lead to catastrophic results.

In a conventional electromechanical fly-by-wire flight control system, an electronic control unit (ECU) sends command signals, via wire, to an electric motor. In response to these command signals, the motor drives a linear ballscrew or Acme-threaded actuator which is linked to the control surface. Should the ballscrew or Acme-threaded actuator jam, the motor fail or a wire break, the primary control surface cannot be controlled.

Linear electromechanical actuators that are fault-tolerant are known to the prior art. A non-jamming screw actuator is disclosed in Klopfenstein U.S. Pat. No. 4,745,815. An outer ballscrew nut is threaded onto an intermediate ballscrew, which is threaded onto an inner screw. A first brake prevents the ballscrew from rotating and a second brake prevents the inner screw from rotating. When a motor rotates the ballscrew nut, the ballscrew and inner screw are moved axially as a unit. In the event of jamming between the outer nut and intermediate ballscrew, the first brake is released, allowing the intermediate ballscrew to rotate with the nut. The rotating ballscrew causes the inner screw to move axially.

Although the screw actuator is tolerant to a single fault, the motor is not. If the motor fails, so too does the system.

SUMMARY OF THE INVENTION

A linear electromechanical actuator system according to the present invention is tolerant to a single fault. The system comprises first and second linear actuator means. The first linear actuator means includes first screw means and first nut means threadedly engaging the first screw means; and the second linear actuator means includes second screw means and second nut means threadedly engaging the second screw means. The first and second nut means are secured together.

BRIEF DESCRIPTION OF THE DRAWING

FIG. 1 is a cross-sectional view of a linear electromechanical actuator according to the present invention.

FIG. 2 is a cross-sectional view, taken along lines 2—2, of the actuator shown in FIG. 1.

DETAILED DESCRIPTION OF THE PREFERRED EMBODIMENT

Referring to FIG. 1, a linear electromechanical actuator 10 includes first and second ballscrew actuators 12A and 12B that are arranged back-to-back. The first ballscrew actuator 12A includes a first leadscrew 14A and a first ballscrew nut 16A whose internal threads engage the threads of the first leadscrew 14A. The unthreaded end of the first leadscrew 14A is journalled for rotation within the first housing 18A by bearings 20A. The second ballscrew actuator 12B, including a second leadscrew 14B, second ballscrew nut 16B, second housing 18B and bearings 20B, is identical to the first ballscrew actuator 12A, except that the stroke of the second leadscrew 14B is twice as long as the stroke of the first leadscrew 14A. Stops 21A and 21B prevent the first and second ballscrew nuts 16A and 16B from disengaging the first and second leadscrews 14A and 14B.

The first and second ballscrew nuts 16A and 16B are rigidly joined together by an interfacing sleeve 22. The first ballscrew nut 16A is attached to one end of the sleeve 22 by means such as dowel-pins 24 and bolts, and the second ballscrew nut 16B is similarly attached to the opposite end of the sleeve 22.

The sleeve 22 is received by the first and second housings 18A and 18B, sliding therebetween. Although allowed to slide, the sleeve 22 must not be allowed to rotate with respect to either housing 18A or 18B. To permit axial movement only, the sleeve 22 is splined to the housings 18A and 18B by splines 26A and 26B (see FIG. 2). Alternatively, the sleeve 22 can be keyed to the housings 18A and 18B, or the sleeve 22 can be shaped (e.g., hexagonally) to prevent rotation.

The first and second housings 18B are moved apart when one leadscrew is locked and the other leadscrew is rotated. When the first ballscrew actuator 12A is affixed to a stationary structure, the second ballscrew actuator 12B functions as a thrust rod.

The second housing 12B can be moved by locking the second leadscrew 14B and rotating the first leadscrew 14A. With the second leadscrew 14B locked, the second ballscrew nut 16B and sleeve 22 can neither slide or rotate with respect to the second housing 18B. Rigidly attached to the sleeve 22, the first ballscrew nut 16A cannot be rotated or slid either. As the first leadscrew 14A is rotated, it threadedly engages or disengages the first ballscrew nut 16A, causing the first ballscrew nut 16A to move linearly, between a first position A (near the unthreaded end of the first leadscrew 14A) and a second position B (near the threaded end of the first leadscrew 14A). The stroke of the first leadscrew 14A is the distance between positions A and B. Moving as a unit with the first ballscrew nut 16A are the sleeve 22, second ballscrew nut 16B, second leadscrew 14B and second housing 18B.

Alternatively, the second housing 18B can be moved by locking the first leadscrew 14A to the first housing 18A and rotating the second leadscrew 14B. With the first leadscrew 14A locked, the first ballscrew nut 16A, sleeve 22 and second ballscrew nut 16B are also locked. As the second leadscrew 14B threadedly engages or disengages the second ballscrew nut 16B, the second ballscrew nut 16B moves between a third position C (near the threaded end of the second leadscrew 14B) and a fourth position D (near the unthreaded end of the second leadscrew 14B). The stroke of the second leadscrew 14B is the distance between positions C and D. Moving with the second leadscrew 14B in a linear direction is the second housing 18B.

In a primary mode of operation, the second leadscrew 14B is locked with the second ballscrew nut 16B intermediate the third and fourth positions C and D, and the first leadscrew 14A is rotated such that the first ballscrew nut 16A moves between the first and second positions A and B. When the first ballscrew nut 16A is at the first position A, the second housing 18B is at a fully retracted position; and when the first ballscrew nut 16A is at the second position B, the second housing 18B is at a fully extended position. The overall stroke of the actuator 10 is the distance between the retracted and extended positions.

If the first ballscrew nut 16A jams, the actuator 10 is operated in a backup mode. Because the stroke of the second leadscrew 14B is twice as long as that of the first leadscrew 14A, the second housing 18A can be moved to the fully extended position even though the first ballscrew nut 16A becomes stuck in the first position A. Similarly, the second housing 18B can be moved to a fully retracted position even though the first ballscrew nut 16A becomes stuck in the second position B. Thus, the actuator 10 can operate over a full stroke regardless of where the first ballscrew nut 16A becomes jammed.

The overall stroke of the actuator 10 is limited by a torsion bar 28, which extends through bores in both the first and second leadscrews 14A and 14B. One end of the torsion bar 28 is affixed to the first leadscrew 14A and the other end terminates in a nut 30, located in the bore of the second leadscrew 14B. Dogs 32 at the threaded end of the second leadscrew 14B catch the nut 30 as the second housing 18B is being moved towards its fully extended position. A dog stop 34 within the bore of the second leadscrew 14B torsionally stops the second housing 18B from being retracted. When the nut 30 abuts either the dogs 32 or the dog stop 34, the torsion bar 28 twists up and absorbs the rotating momentum of the second leadscrew 14B and housing 18B. Thus, the torsion bar 28 provides a soft stop, allowing the actuator 10 to be stopped at full speed. The fixed end of the torsion bar 28 can be adjusted to limit the stroke of the actuator 10.

The leadscrews 14A and 14B are rotated and locked by a drive unit. A first motor 36A rotates the first leadscrew 14A via a first gear train 38A, and a second motor 36B rotates the second leadscrew 14B via a second gear train 38B. Electrically independent of each other, the motors 36A and 36B can be permanent magnet dc motors, which provide high starting torque and allow precise control. Alternatively, the motors 36A and 36B can be hydraulic motors. Both the motors 36A and 36B and gear trains 38A and 38B are secured to the extreme ends of their respective housings 18A and 18B. Such balanced loading reduces stress and vibrational effects.

To determine position of the first ballscrew nut 16A on the first leadscrew 14A, a counter 40 is coupled to the shaft of the first motor 36A. The counter 40 keeps track of the number of revolutions made by the first leadscrew 14A.

First and second electromechanical brakes 42A and 42B are located upstream of the leadscrews 14A and 14B. For example, the brakes 42A and 42B can be located on the shafts of the first and second motors 36A and 36B. When the first brake 42A is actuated, the first motor 36A and first gear train 38A lock up the first leadscrew 14A. When the second brake 42B is actuated, the second motor 36B and second gear train 38B lock up the second leadscrew 14B.

Operation of the motors 36A and 36B and brakes 42A and 42B can be commanded by a two-channel redundant controller (not shown).

Operation of the actuator 10 is now described in connection with the rudder of a flight control system. This is done primarily for illustrative purposes since the actuator 10 can be employed in any application requiring a controlled linear motion.

The first housing 18A is affixed to a fuselage (not shown) and the second housing 18B is pivotally attached to the rudder (not shown). The controller is an ECU. To maintain the position of the rudder, the ECU actuates both brakes 42A and 42B. To move the rudder, the ECU releases the first brake 42A and actuates the first motor 36A (the primary mode). If, however, the rudder does not move in response to a rudder command (i.e., the ECU detects a phase lag), the ECU actuates the first brake 42A, releases the second brake 42B and actuates the second motor 36B (the backup mode). In the event both actuators 12A and 12B fail, the ECU releases both brakes 42A and 42B, allowing external forces (e.g., airflow) to backdrive the rudder to a desired position. Once the rudder reaches the desired position, the ECU actuates both brakes 42A and 42B. In the event of power failure, the brakes 42A and 42B are released and the rudder is allowed to free-trail. Thus, the ballscrew actuators 12A and 12B and motors 36A and 36B are tolerant to a single fault. If, during the course of operation, the first motor 36A develops a short or the first leadscrew 14A jams, the second leadscrew 14B and second motor 36B can still move the rudder.

Back-to-back ballscrew actuators 12A and 12B offer advantages other than fault tolerance. Built in testing of the actuator 10 can be performed by rotating both leadscrews 14A and 14B in the same direction. This, in turn, translates the sleeve 22 back and forth without affecting the position of the rudder. Such a test ensures that the ballscrew actuators 12A and 12B and drive unit are operational.

The actuator 10 can be tested at full power on the ground, unlike conventional hydraulic systems. Whereas a hydraulic system requires a structure to test maximum load, speed and rate, the actuator 10 does not. The actuator 10 merely moves the rudder until motion is stopped by the torsion bar 28, and then the actuator 10 rotates the leadscrews 14A and 14B in opposite directions. In this manner, the second ballscrew actuator 12B simulates loading due to external forces. This isometric exercise can be rapidly alternated between the two ballscrew actuators 12A and 12B, with one providing the load and the other resisting the load.

It will be understood that the embodiment described herein is merely exemplary and that many modifications and variations of the present invention are possible in light of the above teachings. For example, the first and second actuators can be Acme-thread actuators instead of ballscrew actuators. Therefore, the scope of the present invention is limited only by the appended claims,

I claim:

1. An actuator, comprising:
   first and second leadscrews arranged back-to-back;
   first and second housings surrounding said first and second leadscrews, said first and second leadscrews being rotatably mounted to said first and second housings; and
   sleeve means for sliding between and within said first and second housings, a first end of said sleeve means threadedly engaging said first leadscrew and a second end of said sleeve means threadedly engaging said second leadscrew, wherein said actuator is operated by rotating one leadscrew and locking the other leadscrew.

2. An actuator according to claim 1, wherein said second leadscrew has twice the stroke as said first leadscrew.

3. An actuator according to claim 1, wherein said second leadscrew has twice the stroke as said first leadscrew.

4. An actuator according to claim 1, wherein said sleeve means includes first and second nut means threadedly engaging said first and second leadscrews; and a collar splined to said first and second housings, said first nut means being affixed to one end of said collar, said second nut means being affixed to an opposite end of said collar.

5. An actuator according to claim 1, further including means for limiting the stroke of said first and second leadscrews.

6. An actuator according to claim 5, wherein said limiting means includes torsion bar means.

7. An actuator according to claim 6, wherein said leadscrews have bores extending therethrough, and wherein said torsion bar means includes:
- a torsion bar disposed within said bores of said first and second leadscrews, one end of said torsion bar being adjustably mounted to said first leadscrew, another end of said torsion bar terminating in a nut located within said bore of said second leadscrew;
- first stopping means, attached to a second end of said second leadscrew, for stopping said nut from exiting said bore of said second leadscrew; and
- second stopping means, disposed within said bore of said second leadscrew, for stopping said nut.

8. An actuator according to claim 1, further comprising first and second rotating means for rotating said first and second leadscrews.

9. An actuator according to claim 8, wherein said first rotating means includes first electric motor means and first gear train means for coupling said first electric motor means to said first leadscrew; and wherein said second rotating means includes second electric motor means and second gear train means for coupling said second electric motor means to said second leadscrew.

10. An actuator according to claim 9, wherein said first and second motor means are dc brushless motors.

11. An actuator according to claim 9, further comprising first and second brake means for braking said first and second leadscrew.

12. An actuator, comprising:
- first and second leadscrews arranged back-to-back;
- first and second nuts threadedly engaging said first and second leadscrews, respectively;
- first and second housings surrounding said first and second leadscrews, said first and second leadscrews being rotatably mounted to said first and second housings; and
- a collar splined to said first and second housings for sliding between and within said first and second housings, a first end of said collar being affixed to said first nut and a second end of said collar being affixed to said second nut, wherein said actuator is operated by rotating one leadscrew and locking the other leadscrew.

* * * * *